June 3, 1941.  W. W. BLAKESLEE  2,244,549
LAMINATED DRAWING BOARD
Filed Oct. 12, 1939   2 Sheets-Sheet 1
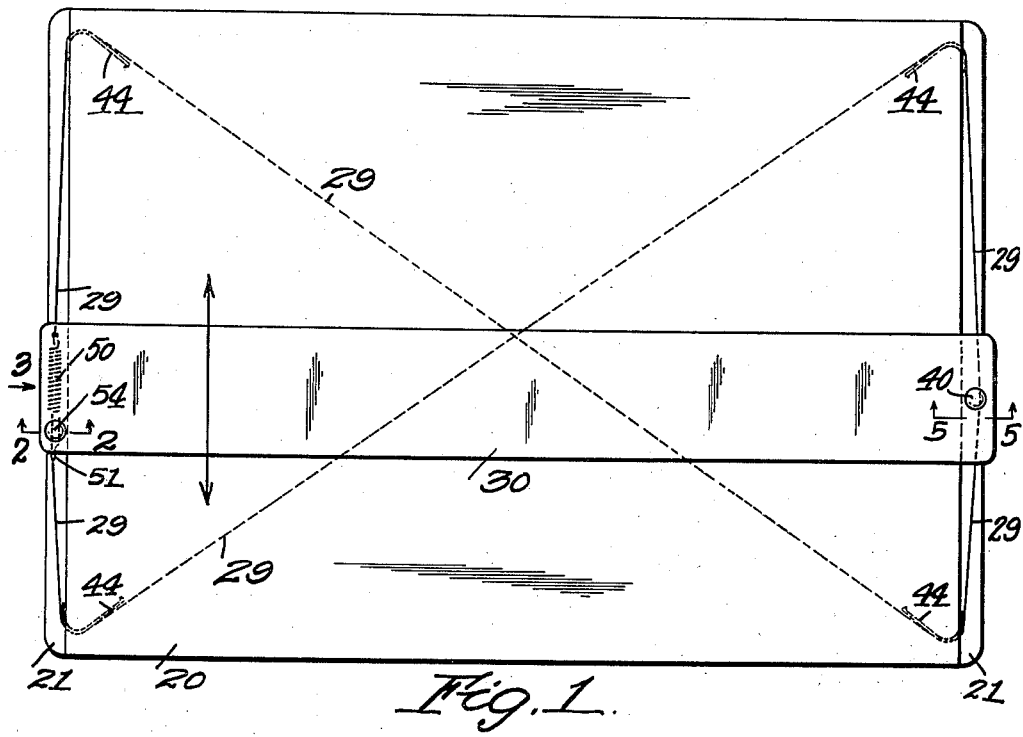
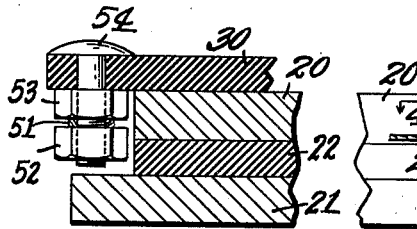
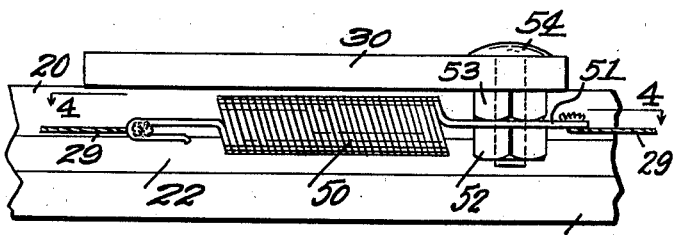
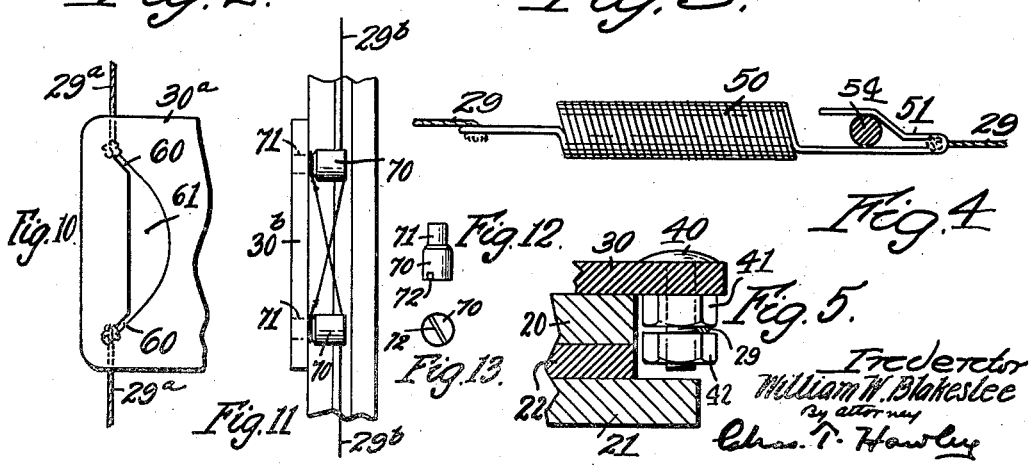

June 3, 1941.  W. W. BLAKESLEE  2,244,549
LAMINATED DRAWING BOARD
Filed Oct. 12, 1939   2 Sheets-Sheet 2

Inventor
William W. Blakeslee
By attorney
Chas. T. Hawley

Patented June 3, 1941

2,244,549

UNITED STATES PATENT OFFICE 2,244,549

LAMINATED DRAWING BOARD

William W. Blakeslee, Brattleboro, Vt.

Application October 12, 1939, Serial No. 299,179

4 Claims. (Cl. 33—80)

This invention relates to a laminated drawing-board particularly adapted for use by draftsmen or artists.

It is the general object of my invention to provide an improved drawing-board of laminated construction which is simple and economical to manufacture and which is markedly resistant to changes in atmospheric conditions. I also provide improved devices for effecting parallel movement of a straight-edge associated with said board.

My invention further relates to arrangements and combinations of parts which will be hereinafter described and more particularly pointed out in the appended claims.

A preferred form of the invention is shown in the drawings, in which

Fig. 1 is a plan view of my improved drawing-board;

Fig. 2 is an enlarged partial sectional elevation, taken along the line 2—2 in Fig. 1;

Fig. 3 is an enlarged partial side elevation, looking in the direction of the arrow 3 in Fig. 1;

Fig. 4 is a detail sectional plan view, taken along the line 4—4 in Fig. 3;

Fig. 5 is an enlarged partial sectional elevation, taken along the line 5—5 in Fig. 1;

Fig. 10 is a partial plan view of a modified cord-attaching construction;

Fig. 11 is a partial side elevation of a second modification; and

Figs. 12 and 13 are side and end views respectively of one of the studs shown in Fig. 11.

Figure 6:
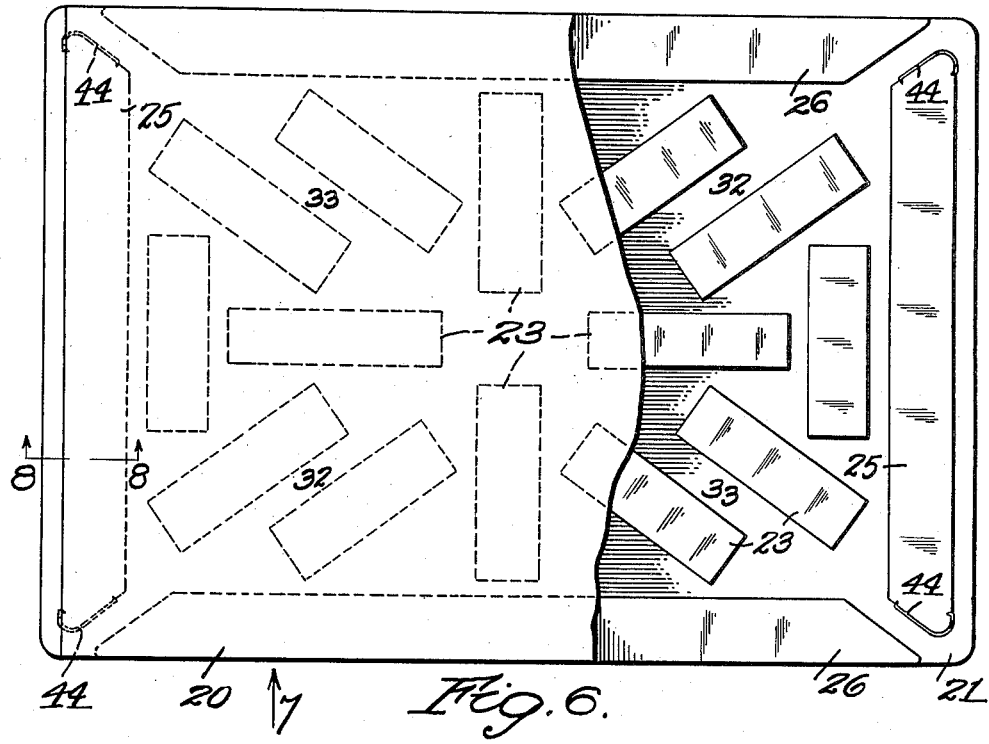
Fig. 6 is a plan view of the board, partially broken away to show interior construction.
Figure 7:
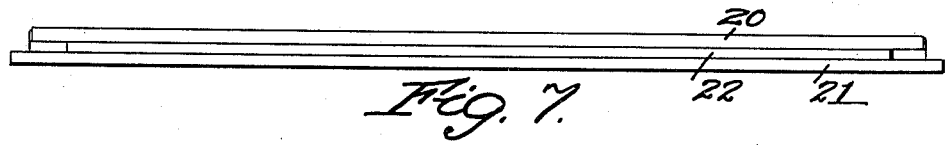
Fig. 7 is an edge view, looking in the direction of the arrow 7 in Fig. 6.
Figures 8, 9:
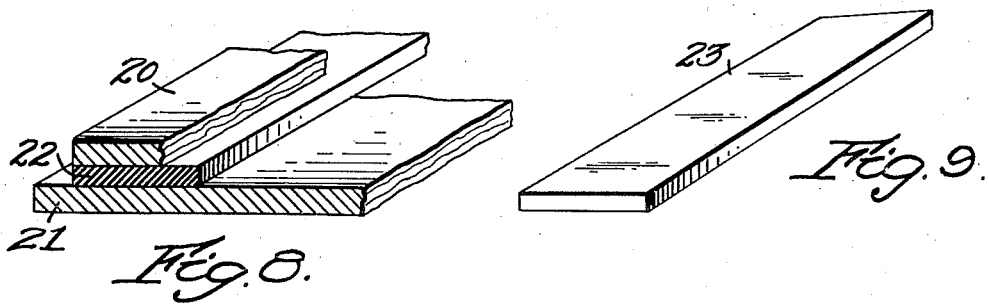
Fig. 8 is a partial sectional elevation, partly in perspective and taken along the line 8—8 in Fig. 6.
Fig. 9 is a perspective view of a block to be described.

Referring to the form of my invention shown in Figs. 1 to 9, my improved drawing-board comprises a front layer 20, a back layer 21, and an interposed layer 22 formed of spaced blocks 23, 25 and 26 (Figs. 6 and 9). Each of the layers 20 and 21 and each of the blocks 23, 25 and 26 comprising the interposed layer 22 may be formed of any suitable material but are preferably of some comparatively inexpensive sheet material such as heavy card-board, clay board, pressed fiber or composition.

In constructing my improved board, I find it desirable to coat the blocks 23, 25 and 26 and in some cases the layers 20 and 21 with a waterproof adhesive coating, such as lacquer. After thus coating the blocks and layers, I assemble them under pressure in some such arrangement as shown in Fig. 6 and secure them permanently together with lacquer, cement or other suitable adhesive. The special elongated blocks 25 and 26 are disposed around the edges of the board, as also shown in Fig. 6. The entire board may then receive a further lacquer coating.

The back layer 21 projects at its side edges beyond the blocks 25 and beyond the side edges of the front or top layer 20, thus providing side recesses for cords 29 which effect parallel movement of a straight-edge 30. The projecting portions of the layer 21 protect the cords 29 from injury or displacement.

The arrangement of the blocks 23 may be somewhat widely varied, but they should be fairly evenly and symmetrically distributed and well spaced and must provide clear diagonal passages 32 and 33 for the aforesaid cords 29.

A laminated drawing-board thus constructed may not only be made of inexpensive material, but by reason of the interposed layer of spaced blocks, the completed board will not warp and is highly resistant to changes in weather conditions. While I have shown a board having three layers, it will be evident that additional layers, both of blocks and of sheet material, may be added in boards of larger size.

I have also provided special devices to be used in the attachment of the cord 29 to the straight-edge 30. In the preferred form, a bolt 40 (Fig. 5) is inserted through one end of the straight-edge 30 and is firmly secured by a nut 41. The middle portion of the cord 29 is then secured between the nut 41 and a second or lock nut 42.

The two end portions of the cord are then passed around the ends of the adjacent block 25 (Fig. 6) and through the diagonal passages 32 and 33, and then around the ends of the opposite block 25.

The ends of these blocks 25 are preferably provided with metal guide-plates 44, secured by spurs in the blocks 25 and providing smooth wearing surfaces for the cord 29. The metal slide plates are found more satisfactory than wheels or pulleys, as they are unchanging and uniform in their action, so that both ends of the straight-edge move smoothly and simultaneously and strict parallelism is maintained.

At the opposite end of the straight-edge, one end of the cord 29 is secured to the free end of a tension coil spring 50, and the opposite end of the cord 29 is secured in a doubled extension 51 of the spring 50. The spaced parts of said extension 51 are secured between nuts 52 and 53 on a bolt 54 clamped to the second end of the straight-edge 30 in the same manner as the stud 40 previously described.

The ends of the cord 29 are thus securely held and the cord is also held tight under the tension of the spring 50. The tension on the two parts of the cord may be equalized and the straight-edge 30 may be adjusted with respect to the drawing-board by loosening the nut 42 (Fig. 5) and slipping the cord relative to said nut.

For a less expensive construction, I may secure the knotted ends of the two portions of the cord 29$^a$ (Fig. 10) in the slotted ends 60 of an opening 61 formed in one end of a straight-edge 30$^a$. This construction serves the same purpose as the construction previously described, except that more care must be taken in adjusting the length of the cord 29$^a$ and in maintaining the cord at the desired tightness under changing weather conditions.

A further modification is shown in Fig. 11, in which two studs 70 are secured in one end of a straight-edge 30$^b$. These studs 70 have reduced neck portions 71 and have slots 72 in their outer ends. The end portions of the cord 29$^b$ may be conveniently attached by forming loops therein which are slipped over the studs and on to the neck portions 71, after which the cords are guided into the slots 72.

In all cases, the crossed and diagonal arrangement of the cords limits the straight-edge to movements parallel to itself, as it is shifted toward the top or bottom of the drawing-board.

Having thus described my invention and the advantages thereof, I do not wish to be limited to the details herein disclosed, otherwise than as set forth in the claims, but what I claim is:

1. A laminated drawing-board comprising complete and continuous front and back layers of sheet material and an interposed layer formed of a plurality of spaced blocks of sheet material, all of said layers and blocks being adhesively secured together, said board having a straight-edge associated therewith and having parallel-motion cords, and said blocks being closely adjacent each other over the entire area of said board but being so positioned and sufficiently separated as to provide narrow clear diagonal passages in said board for said cords and between said front and back layers.

2. A laminated drawing-board comprising complete and continuous front and back layers of sheet material and an interposed layer formed of a plurality of spaced blocks of sheet material, all of said layers and blocks being adhesively secured together, said blocks being closely adjacent each other over the entire area of said board but being so positioned and sufficiently separated as to provide narrow diagonal open cord passages in said board and between said front and back layers, and certain of said blocks having rounded beveled ends and being substantially aligned with the side edges of said front layer, and fixed cord-guiding plates for said latter blocks, said plates extending around the rounded beveled ends of said latter blocks and being permanently secured to said blocks in cord-guiding positions.

3. In a drawing-board having a straight-edge associated therewith and having crossed parallel-motion cords for said straight-edge, that improvement which comprises providing an opening in one end of said straight edge and two oppositely directed constricted slots leading out from the opposite ends of said opening and effective to receive and hold the ends of said cord.

4. In a drawing-board having a straight-edge associated therewith and having crossed parallel-motion cords for said straight-edge, that improvement which comprises a pair of studs secured to the under side of said straight-edge at one end thereof, each stud having a neck portion to receive a cord loop and having a slotted outer end to receive and position a portion of said cord.

WILLIAM W. BLAKESLEE.